US005616659A

United States Patent [19]

Deviney et al.

[11] Patent Number: 5,616,659
[45] Date of Patent: Apr. 1, 1997

[54] LOW FLAMMABILITY THERMOSET POLYMERS

[75] Inventors: Marvin L. Deviney; Joel J. Kampa, both of San Antonio, Tex.

[73] Assignee: Southwest Research Institute, San Antonio, Tex.

[21] Appl. No.: 595,023

[22] Filed: Jan. 31, 1996

Related U.S. Application Data

[63] Continuation-in-part of Ser. No. 183,500, Jan. 19, 1994, abandoned.

[51] Int. Cl.$^6$ .......................... C08L 61/06; C08L 61/10; C08L 61/14

[52] U.S. Cl. .................. 525/480; 525/504; 525/538; 525/540; 528/141; 528/167; 528/168; 558/70; 558/152

[58] Field of Search ............................ 525/480, 504, 525/538, 540; 528/141, 167, 168; 558/70, 152

[56] References Cited

U.S. PATENT DOCUMENTS

| | | | |
|---|---|---|---|
| 4,430,491 | 2/1984 | Culbertson et al. | 528/153 |
| 4,551,511 | 11/1985 | Goel | 526/204 |
| 4,558,114 | 12/1985 | Goel | 528/73 |
| 4,579,875 | 4/1986 | Goel | 521/115 |
| 4,613,662 | 9/1986 | Goel | 528/137 |
| 4,626,575 | 12/1986 | Goel | 525/329.5 |
| 4,639,505 | 1/1987 | Goel | 528/211 |
| 4,640,969 | 2/1987 | Goel et al. | 528/73 |
| 4,644,052 | 2/1987 | Goel et al. | 528/363 |
| 4,652,620 | 3/1987 | Tufts et al. | 525/504 |
| 4,658,011 | 4/1987 | Goel | 528/409 |
| 4,661,600 | 4/1987 | Goel | 548/217 |
| 4,675,371 | 6/1987 | Goel | 526/260 |
| 4,699,970 | 10/1987 | Tiba et al. | 528/141 |
| 4,709,040 | 11/1987 | Goel | 548/237 |
| 4,737,572 | 4/1988 | Goel | 528/368 |
| 4,737,574 | 4/1988 | Goel | 528/374 |
| 4,746,719 | 5/1988 | Goel et al. | 528/137 |
| 4,748,230 | 5/1988 | Tiba et al. | 528/211 |
| 4,754,010 | 6/1988 | Goel | 526/260 |
| 4,762,883 | 8/1988 | Goel | 525/113 |
| 4,775,737 | 10/1988 | Goel | 528/167 |
| 4,806,267 | 2/1989 | Culbertson et al. | 252/182.23 |
| 4,814,223 | 3/1989 | Tiba et al. | 428/246 |
| 4,839,446 | 6/1989 | Culbertson et al. | 525/504 |
| 4,841,002 | 6/1989 | Culbertson et al. | 525/504 |
| 4,843,142 | 6/1989 | Sano et al. | 528/211 |
| 4,843,143 | 6/1989 | Culbertson et al. | 528/211 |
| 4,910,265 | 3/1990 | Matsumura et al. | 525/333.3 |
| 4,931,512 | 6/1990 | Matsumura et al. | 525/333.3 |
| 5,302,687 | 4/1994 | Culbertson et al. | 528/153 |
| 5,385,778 | 1/1995 | Deviney et al. | 428/319.7 |
| 5,403,655 | 4/1995 | Deviney et al. | 428/319.7 |

OTHER PUBLICATIONS

Culbertson et al., "Thermosetting Matrix Compositions With Improved Toughness To Meet New FAA Aircraft Interiors Fire Worthiness Requirements," pp. 1531–1545, 33$^{rd}$ Int'l SAMPE Symposium (1988).

Culbertson et al., "Thermosetting Bisoxazoline–Phenolic Resin Matrix Materials for Aerospace Industry Applications," pp. 830–833, vol. 59 ACS Polymeric Materials Science & Engineering (1988).

Culbertson et al., "Bisoxazoline–Phenolic Resins: New Thermosetting Poly (Amide–Ether) Materials for Improved Performance Composites," pp. 590–604, 20$^{th}$ Int'l SAMPE Technical Conference (1988).

Culbertson et al., "Bisoxazoline–Phenolic Resin Step–Growth Copolymerizations: New Systems for Electronic, Mold Making, and Resin Transfer Molding," 8 pages, 34$^{th}$ Int'l SAMPE Symposium (1989).

DeViney et al., "SEM and X–Ray EDS Studies on the Adhesion of Novel Bisoxazoline–Phenolic Copolymers to Carbon and Glass Fibers, and Metallic Filler Surfaces," pp. 564–565, reprint 47$^{th}$ Annual Mtg of the Electron Microscopy Society of America (1989).

DeViney et al., "Bisoxazoline–Phenolic Resin Low Flammability Composites for Aircraft Interiors," 2 pp., 40$^{th}$ Anniversary Tech. Conf., ACS Div. Of Polymer Chemistry (1991).

Culbertson et al., "Bisoxazoline–Phenolic Resin Step–Growth Copolymerizations: A New Source of High Performance Matrix Resins for Composites," pp. 1–52, presented at SAMPE Int'l Symposium (May 11, 1989).

*Primary Examiner*—W. Robinson H. Clark
*Attorney, Agent, or Firm*—Madan & Morris

[57] ABSTRACT

Novel bisoxazoline monomers and novel bisoxazoline-novolak thermoset polymeric systems made therewith which have increased flame resistance.

27 Claims, No Drawings

LOW FLAMMABILITY THERMOSET POLYMERS

This application is a continuation-in-part of Ser. No. 08/183,500, filed Jan. 19, 1994 which is now abandoned.

FIELD OF THE INVENTION

Applicant's invention relates to novel bisoxazoline-novolak thermoset resins having increased flame retardant qualities and to novel precursors used to make such resins.

BACKGROUND OF THE INVENTION

Currently, polymeric systems are made fire retardant using liquid or fine particulate additives to the polymeric system which do not chemically bond directly to the polymer chain. These additives include phosphate containing compounds such as triphenylphosphates, triarylphosphates, and trialkylphosphates.

Although phosphate containing additives can render polymeric systems more fire resistant, such additives also tend to have unwanted plasticizing effects. Consequently, polymers can be treated with phosphate containing additives only in limited quantities. Another drawback of such additives is that they tend to migrate. As a result, the fire resistance imparted by such additives is not consistent throughout the polymer. Particulate additives also can cause processing difficulties and can initiate microcracks in the cured polymer, unless the particulates are very small (i.e., submicron in size).

Consequently, a need exists for polymers: (a) with high modulus, compression, shear strength, and impact resistance; (b) that can be used in place of metal components; (c) that uniformly meet higher flame retardation requirements; and, (d) that are not affected by unwanted plasticizing effects.

SUMMARY OF THE INVENTION

The present invention provides novel bisoxazoline cross-linked novolak polymers with pentavalent phosphorus ester functional groups attached to the polymer backbone at (1) the aryl moiety bound to the oxazolyl groups in the bisoxazoline monomer; (2) the aromatic hydroxyl group(s) of the novolak resin; or (3) both. The inclusion of pentavalent phosphorus esters in the backbone of the polymer uniformly increases the flame resistivity of the polymer, yet maintains the high modulus, compression, shear strength, and impact resistance of the unmodified polymeric system.

DETAILED DESCRIPTION OF THE INVENTION

The novel polymer systems of the present invention may be used to manufacture items that require higher flame resistive qualities. Such items include offshore oil rigs, submersible vessels, ship components used below deck, aircraft, and other items where polymers are favored over metals to meet weight reduction, greater buoyancy, and low corrosion requirements. The components may be prepared in reinforced or composite form using resin transfer molding, pultrusion, prepregging filament winding, and injection molding techniques.

According to the present invention, pentavalent phosphorus esters are chemically bonded to the bisoxazoline monomeric precursor, the novolak resin, or both. The amount and location of pentavalent phosphorus ester depends upon how fire retardant the final product must be.

The ability to chemically bond the pentavalent phosphorus esters either to the oxazoline or to the novolak precursor makes it possible to prepare a wide range of curable resin blends for composite fabrication. Selective blending can minimize the cost of the polymer and optimize the polymer's mechanical strength, processability, and low flammability properties. Fire resistant polymers can be used where only metals have been used before due to the danger of flammability. In a preferred embodiment, the polymers are used to make composites that not only are highly flame retardant, but also have an intumescent, heat-reflecting shield incorporated into their outer plies.

The pentavalent ester that is incorporated into the polymeric backbone may be phosphate, pyrophosphate, polyphosphate, phosphonate, polyphosphonate, phosphinate or polyphosphinate ester groups. Pentavalent phosphorus ester groups are used because they are inert and do not cause problems during polymerization. In contrast, several trivalent phosphorus compounds act as a catalyst that would prematurely open the oxazoline rings. The pentavalent phosphorus ester groups may be substituted, as discussed below, with the limitation that the substituent must be free of halogens that could result in the release of toxic, corrosive halogen acids upon exposure to severe flame or heat conditions and decomposition.

A. The Bisoxazoline Monomer

Bisoxazoline monomers that have been modified with pentavalent phosphorus group(s) hereinafter will be called "phosphate modified bisoxazoline monomers." Preferably, such compounds should have at least two oxazoline groups, and will have the following general formula:

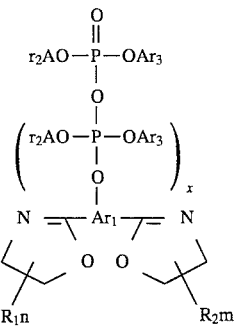

wherein $Ar_1$, $Ar_2$, and $Ar_3$ are the same or different aryl radicals such as phenyl, alkyl substituted phenyl, alkoxy substituted phenyl, naphthyl, alkyl substituted naphthyl, alkoxy substituted naphthyl, fluorenyl, alkyl substituted fluorenyl, alkoxy substituted fluorenyl, alkyl substituted antracenyl, and alkoxy substituted antracenyl; $R_1$ and $R_2$ are the same or different radicals selected from the group consisting of C1–C12, linear or branched alkyl radicals, aryl radicals, and alkoxy radicals; M and n independently are integers having a value between 0 and about 4, and x independently is an integer with a preferred value between 0 and about 6.

Bisoxazolines derived from di- and tri-carboxylic acids are preferred, an example being 3,5-bis(oxazolyl)phenyl diphenylphosphate. Such bisoxazolines generally may be prepared by: esterifying the corresponding carboxylic acid containing a hydroxy group in the "1"-position of the phenyl ring; adding the phosphate group to the resulting ester by mixing with the appropriate halo-phosphate ester; and, then converting the phosphate-substituted ester to the phosphate-substituted bisoxazoline compound by reacting with an appropriate ethanolamine.

The pentavalent phosphorus ester-modified bisoxazoline also may be prepared by directly phosphating an ester salt with chlorodiphenylphosphate in diethyl ether and then reacting with excess ethanolamine to yield the corresponding bis(oxazolyl)aryl-diarylphosphate.

Additional latitude in processing, structural, and flame retardant characteristics may be gained by applying the foregoing novel chemical modification procedures to other oxazoline precursors. Suitable oxazoline precursors should have multiple hydroxy groups and should contain at least two carboxylic or cyano functions attached to an arene system for conversion to the oxazoline moiety.

One method for preparing phosphate modified bisoxazoline monomers involves converting commercially available hydroxylic aromatic dialdehydes to the corresponding hydroxylic aromatic dinitriles using known procedures. See, e.g., CA: 92:146462y (1980); S. Umemura, et al. *Jpn. Kokai Tokkyo Koho* 79, 145, 633 (1979), incorporated herein by reference. The resulting nitriles then may be converted to the corresponding hydroxylic aromatic bisoxazolines by reaction with the appropriate hydroxyamine using known procedures. See H. Witte, W. Seeliger, *Liebigs Ann. Chem.* (1974) 996, incorporated herein by reference. The remaining aromatic hydroxylic functionalit(ies) then can be converted to the phosphate ester by reacting with chlorodiphenylphosphate. Alternately, the hydroxy group may be esterified prior to conversion of the nitrile to the oxazoline. In either case, the result is a phosphate ester incorporating a phenylene bis(oxazoline) unit capable of crosslinking a suitable aromatic hydroxyl source (such as phenolic or resorcinolic novalak) to yield a thermoset resin.

An alternate reaction scheme for producing phosphate modified bisoxazoline monomers involves converting commercially available hydroxylic aromatic dialdehydes to the corresponding phenylene bisoxazoline by reacting with the appropriate azidohydrin using known procedures. See J. H. Boyer, J. Hamer. *J. Am. Chem. Soc.* 77 (1955) 951, incorporated herein by reference.

The following illustrates the foregoing reactions, starting with hydroxylic aromatic dialdehydes:

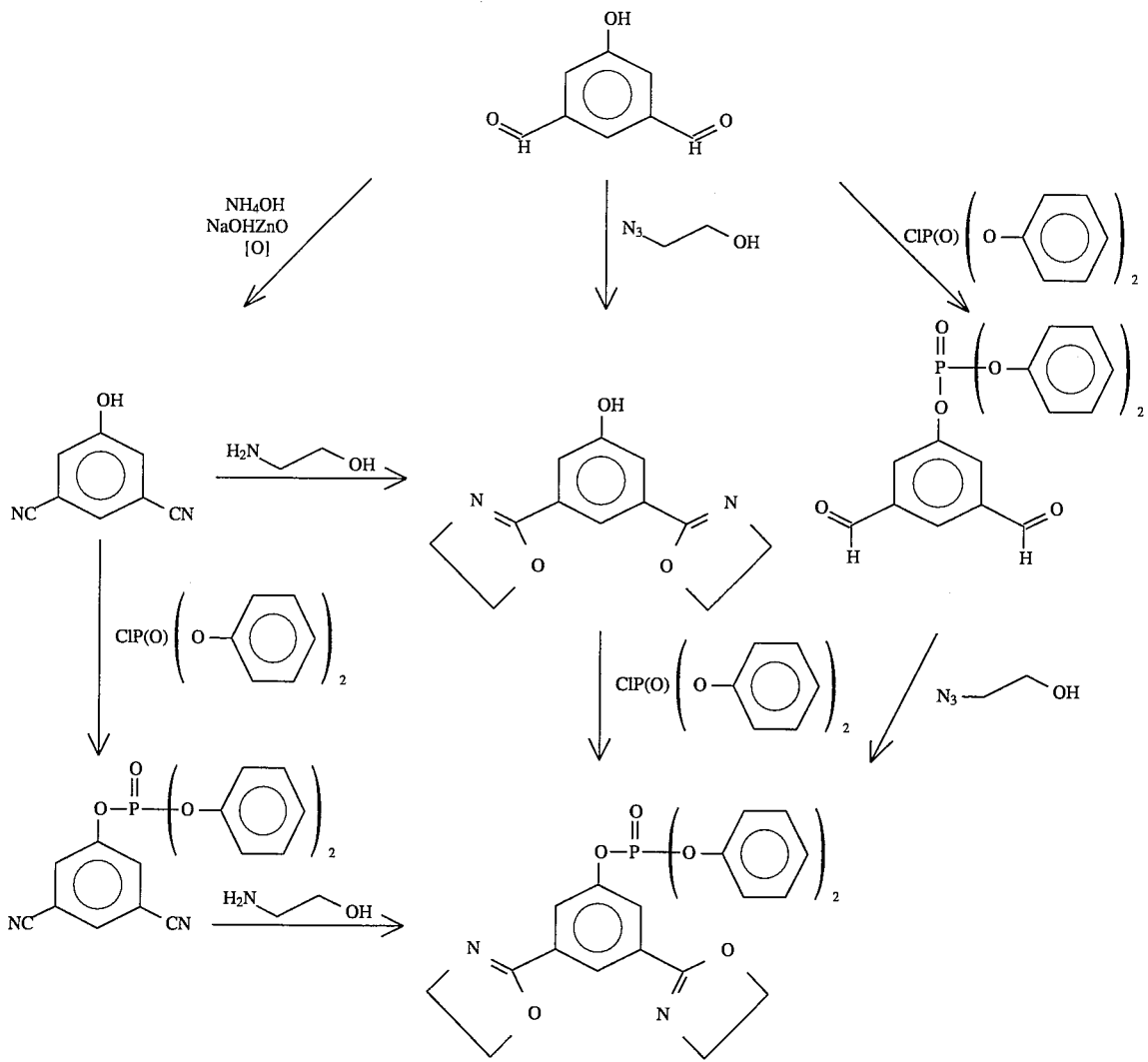

The arene precursors used in these reactions are characterized by the general formula:

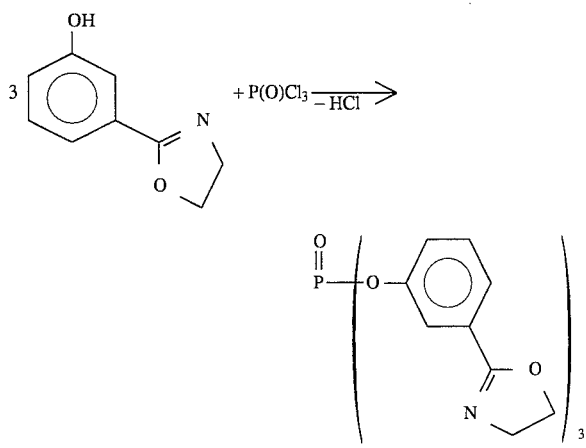

wherein Q is N, $O_2H$ or $O_2J$, J being any alkyl or aryl group; T is H or an alkali metal; and y independently is an integer having a preferred value between about 1 and about 4.

Another alternate pathway for creating desired phosphate modified bisoxazolines involves preparing a phenol having only one oxazoline function using known methods. D. St. C. Black, M. J. Wade, *Aust. J. Chem.* 25 (1972) 1797, incorporated herein by reference. The oxazoline containing phenol then may be used to prepare a triarylphosphate ester with three oxazoline functions capable of crosslinking a suitable aromatic hydroxyl source to prepare a thermoset resin. The following is an illustration of the relevant reaction:

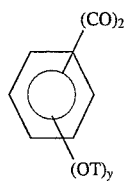

If the oxazoline compound does not contain a phosphate ester substituent, then the following general formula represents suitable oxazolines that may be reacted with a phosphate ester-modified novolak resin:

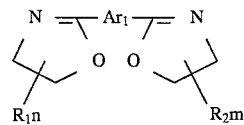

wherein $Ar_1$, $R_1$, $R_2$, n and m are the same as listed above in reference to general formula.

B. The Novolak Resin

The novolak resins that are useful to practice the present invention are condensation products made from a methylene donor and a methylene acceptor. Examples of methylene donors include, but are not necessarily limited to, formaldehyde, paraformaldehyde, N-(substituted oxymethyl) melamine, hexamethylaminetetramine, hexamethoxymethylmelamine. Examples of methylene acceptors include, but are not necessarily limited to, phenol, dihydroxybenzene compounds including resorcinol and resorcinolic esters, and trihydroxybenzene compounds or esters thereof. As shown, the novolak resins have at least one aromatic hydroxyl group. If the novolak resin is to be phosphate modified, then the novolak resin should have more than one aromatic hydroxyl group so that at least one hydroxyl group is available for (a) phosphate esterification, and (b) crosslinking via an oxazoline group.

Novolak resins suitable for use in the present invention include, but are not necessarily limited to, phenolic novolak resins, resorcinolic novolak resins, and pyrogallol novolak resins. Preferred resins are resorcinolic novolak resins. The novolak resin may be substituted, with the requirement that the substituent group cannot be reactive with the oxazoline group(s), the aromatic hydroxyl group(s), or the phosphate ester substituent group(s) attached to the bisoxazoline compound and/or the novolak resin. Examples of suitable substituent groups for the novolak resins include, but are not necessarily limited to: alkyl groups, aryl groups, cyano groups, nitro groups, alkoxy groups, aryloxy groups, alkyl and aryl sulfide groups, alkyl or aryl substituted tertiary amine groups, amide groups, etc.

If the novolak resin is to be phosphate modified, then the aromatic hydroxyl groups can be phosphate modified by reaction with chlorodiphenylphosphate. An example of a preferred? novolak resin is a diarylphosphate modified resorcinolic novolak resin, which may be prepared by reacting a commercially available resorcinolic novolak resin with chlorodiphenylphosphate.

After phosphate modification, at least one hydroxyl group on each phenolic entity in the novolak resin should remain available for cross-linking via bisoxazoline. In a preferred embodiment, between about 5–25% of the aromatic hydroxyl groups on the novolak resin are substituted with pentavalent phosphorus ester functional groups.

C. The Novel Polymeric Composition

The reaction between the bisoxazoline monomers and the hydroxyl groups of the novolak polymer is a step growth polymerization. The reaction may be carried out in the melt or in a high boiling aprotic solvent such as dimethysulfoxide, N,N-dimethylformamide, or N-methylpyrrolidone. The solvent polymerized material then may be isolated for use in subsequent processing steps.

The components of the thermosetting resin are mutually miscible and typically are combined in the melt at approximately 160° C. (320° F.). The polymer cures at approximately 180° C. (356° F.) in a period of about 12–18 hours. A catalyst may be added in order to greatly decrease the curing time required. A listing of some suitable catalysts may be found in U.S. Pat. No. 4,195,154, incorporated herein by reference. Other catalysts will be known by those skilled in the art. After curing, a short, 1 to 2 hour "freestanding" postcure at 200°–220° C. (392°–428° F.) normally is required.

For example, a diarylphosphate-modified resorcinolic novolak resin may be combined with a phosphate ester-modified bisoxazoline compound as reflected below. Heat and a catalyst are used to reduce the reaction time. The bisoxazoline compound is the cross-linking agent or the step-growth polymerization agent. In the reaction, the oxazoline ring is opened and attaches to the hydroxyl group on the aromatic ring of the diarylphosphate-modified resorcinolic novolak resin, creating an ether linkage. The ring opening reaction also produces an amide linkage to the aryl group originally linking the two oxazoline rings.

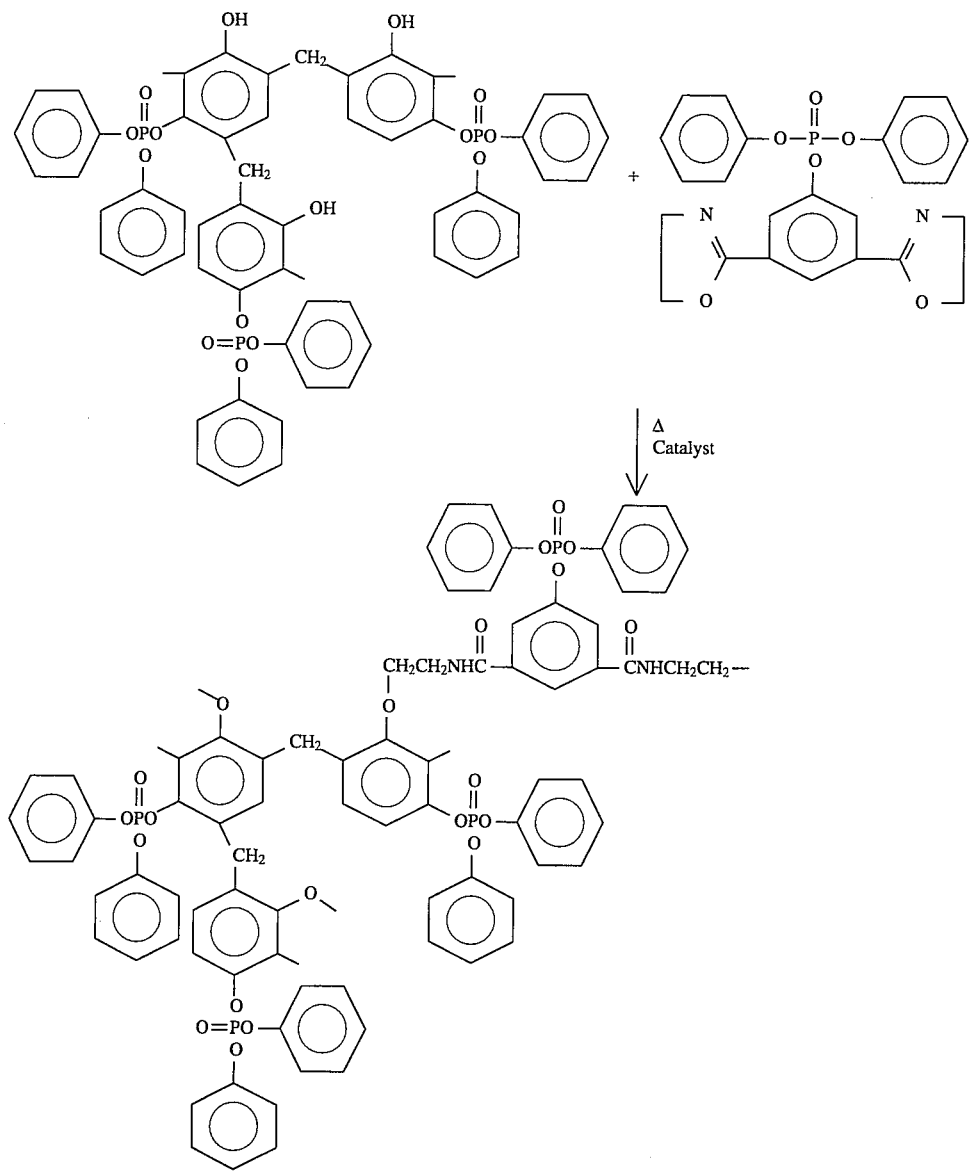

The preceding reaction illustrates only two of the numerous precursors that can be used to create Applicant's novel fire retardant, thermoset, polymeric systems and should not be construed as limiting applicant's invention. In general, about 5–95% by weight of a phosphate ester-modified bisoxazoline compound (i.e., a compound having two bisoxazoline groups which may react with an aromatic hydroxyl group of a novolak resin) is dissolved in about 5–95% by weight of a novolak resin. A preferred ratio is between about 30–70%, most preferably 33–67%, by weight of the phosphate ester-modified bisoxazoline compound to about 30–70%, most preferably 33–67%, by weight of said novolak resin.

Due to the difficulty in determining equivalent weights of a novolak resin, applicants have described the percentages of the precursors in weight percents. If a method to determine the equivalent weights of a novolak resin were made available, then about 0.1 to about 0.75 equivalent weight of a phosphate-modified bisoxazoline monomer compound would be dissolved in about 1 equivalent weight of an aromatic hydroxy group attached to the novolak resin. A preferred range would be between about 0.3 to about 0.6 equivalent weight of the phosphate-modified bisoxazoline monomer compound per about 1 equivalent weight of aromatic hydroxy groups attached to the novolak compound.

D. Smoke Suppressant Additives

Suppression of smoke also is a concern when using polymeric resins, particularly where the potential exists for the polymer to be ignited by an intense flame. Smoke evolution may be suppressed by incorporating selected smoke-inhibiting chemicals into the polymer. Examples of available smoke suppressant additives include fumed silica, MgO, $TiO_2$, $Al_2O_3 \cdot 3H_2O$, $SnO_2$ and carbon black. These additives should be added to the polymer as finely disbursed particulates of less than 50 microns, and preferably less than 1 micron. Other suitable additives could possess functional groups that react with the bisoxazoline monomer or the novolak polymer to chemically bond to the polymer. Such additives include ferrocene, and the iron, chromium, and manganese complexes with 8-hydroxyquinoline and phthalocyanine, at about a five percent loading (based on the metal).

A preferred smoke suppressant additive is fumed silica, which is effective at concentrations of between about 2 to 4% by weight, preferably about 3% by weight. The remaining additives are effective at concentrations of between about 10–15% by weight. Without limiting the invention to a particular theory, fumed silica is believed to be effective at lower concentrations because it has a high surface area that effectively absorbs or traps soot nuclei or tiny particulates which otherwise would grow into particles.

E. Intumescent Shields

In several applications, the intumescent and heat reflecting qualities of the polymer become important. If the outer 2 or 3 plies of the polymer are properly formulated with an intumescent package, exposure of the outer surface to flames or intense heat will create a charred and glassy foam having about 6 to 8 times the thickness of the original outer plies. The foamed intumescent surface reflects heat and physically keeps flame away from the inner plies of the composite. Because the bulk of the composite is never exposed to temperatures above about 100°–150° C. (212°–302° F.), the composite retains most of its inherent strength.

The intumescent package comprises, based on the total weight of the polymeric system, (a) about 20 to 24% by weight of a salt of a strong acid such as ammonium phosphate or the salts of boric or sulfuric acid, and (b) about 16 to 20% by weight of a nitrogen containing blowing agent such as melamine, melamine phosphate, melamine borate, melamine cyanurate, urea dicyandiamide and urea-formaldehyde. The intumescent package preferably is added to the outer plies of the composite by prepregging. The inner plies may or may not be prepregged with the intumescent package. In a preferred embodiment, the intumescent package is combined with a bisoxazoline-novolak polymeric system in which a large majority of the phosphate ester groups are attached to the bisoxazoline monomer and most of the aromatic hydroxyl groups in the novolak resin are unreacted.

When the outer plies of a polymer containing the intumescent package are contacted by a flame source of 150°–225° C. (302°–437° F.), the thermal decomposition of the strong acid salt generates a strong acid. The acid esterifies the unreacted aromatic hydroxyl groups in the novolak resin to produce a carbonaceous, glassy char. As the temperature increases to about 240°–360° C. (404°–680° F.), the nitrogen-containing blowing agent decomposes, releasing gaseous products (ammonia, nitrogen and carbon dioxide), thereby producing a charred, glassy foam.

EXAMPLES

Example 1

The preparation of phosphate ester-substituted 1,3-phenylene bisoxazoline monomer was carried out in a series of steps designed to protect other functional groups. 5-hydroxyisophthalic acid was esterified with methanol to dimethyl-5-hydroxyisophthalate as shown below to protect the carboxylic acid groups during the next step.

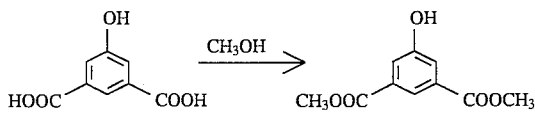

The dimethyl-5-hydroxyisophthalate is then reacted with chlorodiphenylphosphate in the presence of an acid scavenging amine to create a phosphate ester.

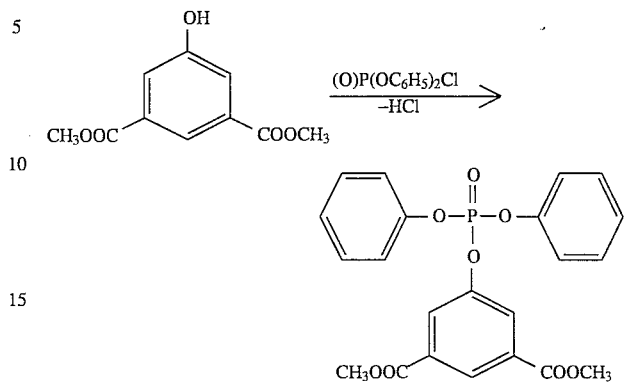

The phosphate ester is then converted to 3,5-bis(oxazolyl)phenol diphenylphosphate with (mono)ethanolamine:

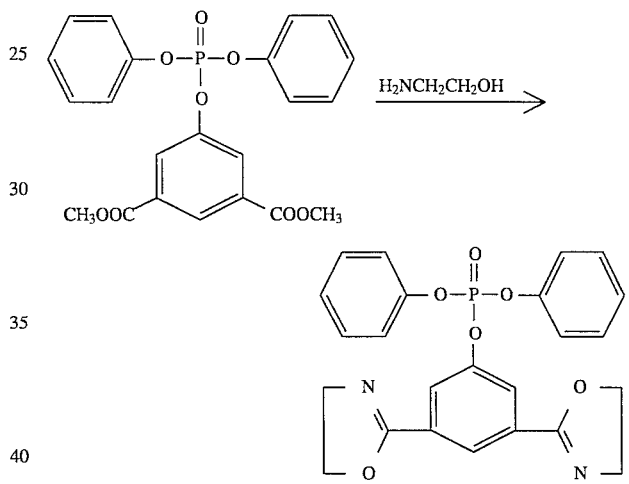

The products from each reaction sequence may be purified and characterized by standard techniques such as $^1$H NMR, $^{13}$C NMR and infrared spectroscopy.

Example 2

Under nitrogen, 2.2 g of the sodium salt of 5-hydroxy dimethylisophthalate was reacted with 1.95 ml of chlorodiphenylphosphate in diethyl ether at reflux and yielded 3,5-bis(methycarboxylato)phenyl diphenylphosphate. Reaction with excess ethanolamine at 180° C. (356° F.) for 2 h with stirring, followed by evacuation of the reaction flask for an additional hour, will render 3,5-bis(oxazolyl)phenyl diphenylphosphate. The final product may be identified by $^{13}$C and $^1$H NMR, and infrared spectroscopy.

Example 3

Under nitrogen, 2.0 g of 2-(hydroxy) dimethylterephthalate and 1.0 ml of triethylamine was dissolved in 150 ml of diethyl ether. 1.95 ml of chlorodiphenylphosphate in 30 ml diethyl ether was then added with stirring at room temperature. The reaction mixture was refluxed for approximately 2 h. The resulting solution was filtered and the solvent evaporated to yield the dimethyl terephthalate substituted diphenylphosphate ester, which may be reacted with ethanolamine at 180° C. (356° F.) for 2 h to yield 2,5-bis(oxazolyl)phenyldiphenylphosphate. The final product may be identified using $^{13}$C and $^1$H NMR and infrared spectroscopy.

Example 4

5 g of chlorodiphenylphosphate was dissolved in 20 ml of pyridine and added dropwise with stirring to 5 g of a resorcinolic novolak dissolved in 50 ml of pyridine at room temperature. The reaction mixture was refluxed for 12 h with continued stirring. The pyridine was evaporated and the reaction mixture dissolved in methylene chloride and filtered. The diphenylphosphate-substituted resorcinolic novolak was precipitated as a heavy, viscous oil by pouring the methylene chloride solution into 10 times its volume of hexane. The solvents were then decanted. After repeating the solution and precipitation steps 4 times, the phosphate-substituted resorcinolic novolak was vacuum dried at approximately 100° C. (212° F.). The final product was analyzed with NMR techniques. $^{13}$C and $^1$H NMR spectroscopy confirmed the incorporation of the diphenylphosphate moiety. Proton NMR indicated that approximately 25% of the phenolic hydroxyl groups were replaced by the phosphate ester group.

Example 5

1 g of the phosphate ester-substituted resorcinolic novolak resin prepared in Example 4 was melted at 120° C. (248° F.). 0.5 g of 1,3-phenylene bisoxazoline was dissolved in the resin. The thermosetting resin was poured into a prepared mold and cured at 160° C. (320° F.) for 18 hours and postcured at 200° C. (392° F.) for 2 h. Using thermal analysis (DSC, TGA) methods and infrared spectroscopy, the final product was characterized as a polymeric ether amide thermoset resin containing chemically bonded phosphate aryl ether groups.

Example 6

1.0 g of 3,5-bis(oxazolyl)phenyl diphenylphosphate was melted with 0.5 g of a phenolic novolak resin at 160° C. (320° F.). The thermosetting resin was transferred into a mold and cured at 180° C. (356° F.) for 18 hours and postcured for 2 h at 200° C. (392° F.). Using thermal analysis (DSC, TGA) methods and infrared spectroscopy, the final product was characterized as a polymeric ether amide thermoset resin containing chemically bonded phosphate aryl ether groups.

Example 7

1.0 g of 3,5 bis(oxazolyl)phenyl diphenylphosphate is melted with 0.5 g of Alvonol™ PN-320, a phenolic novolak resin obtained from Hoescht Celanese, at 160° C. (320° F.). Once the melt is homogeneous, 0.7 g of fumed silica (Cab-o-sil PTG grade) is added as a smoke suppressant. The mixture is stirred until the resin is again homogeneous. The product is transferred into a mold and cured at 180° C. (356° F.) for 18 hours and postcured for 2 h at 200° C. (392° F.). Using thermal analysis (DSC, TGA) methods and infrared spectroscopy, the final product is characterized as a polymeric ether amide thermoset resin containing chemically bonded phosphate aryl ether groups.

Example 8

2 g of 3,5-bis(oxazolyl)phenyl diphenylphosphate and 2.2 g of resorcinolic novolak with 40% of the aromatic hydroxy groups replaced with diphenylphosphate ester groups is melted together until a homogeneous solution is reached. The homogeneous solution is quickly poured into a prepared mold. The mold is heated to 180° C. (356° F.) for 18 h for curing and then raised to 200° C. (392° F.) for an additional 2 h post cure. Plaques prepared from the neat resin show improved flame resistance over unsubstituted controls.

Example 9

Composite plies used as intumescence barriers are formulated by combining 2.0 g of 3,5-bis(oxazolyl)phenyl diphenylphosphate with 1.0 g of resorcinolic novolak in the melt stage. Immediately prior to coating the glass/carbon fiber used to form the composite, 25% by weight (0.75 g) of melamine phosphate is added to the resin blend. The resin is then quickly coated on the composite material for subsequent part fabrication and curing.

Example 10

2.0 g of resorcinolic novolak with about 30% of its hydroxyl groups substituted with diphenylphosphate ester groups is melted at 140° C. (284° F.). 3.5 g of 3,5-bis(oxazolyl)-phenyl diphenylphosphate is added to the molten diphenylphosphate modified resorcinolic novolak and stirred until the melt is homogeneous. The molten thermoset is then poured into a prepared mold and cured at 180° C. (356° F.) for 18 h followed by a postcure at 200° C. (392° F.) for 2 h. Using thermal analysis (DSC, TGA) methods and infrared spectroscopy, the final product is characterized as a polymeric ether amide thermoset resin containing chemically bonded phosphate aryl ether groups.

Example 11

4.0 g of a phloroglucolic novolak resin which has 60% of its hydroxyl groups substituted with diphenylphosphate groups is melted at 160° C. (320° F.). 1.2 g of 1,3-phenylene bisoxazoline is added to the molten phloroglucolic novolak with stirring. Once homogeneous, the thermosetting resin is transferred to a prepared mold and cured at 180° C. (356° F.) for 18 h followed by an additional 2 h at 200° C. (392° F.). Using thermal analysis (DSC, TGA) methods and infrared spectroscopy, the final product is characterized as a polymeric ether amide thermoset resin containing chemically bonded phosphate aryl ether groups.

Example 12

5.0 g of 5-hydroxy isophthalaldehyde is aerated in aqueous ammonium and sodium hydroxide in the presence of a 0.05 mol % zinc oxide catalyst. 4 g of 5-hydroxy isophthalonitrile is isolated by recrystallization and reacted with 4.5 g ethanolamine in 150 ml chlorobenzene. 0.05 mol % cadmium acetate is added and the reaction mixture is refluxed overnight. The resulting 5-hydroxy phenylene bis(oxazoline) is reacted with 9.5 g chlorodiphenyl phosphate in 100 ml THF containing 10 ml triethylamine. After recrystallization from diethylether, 10 g of 5-diphenylphosphate-1,3-phenylene bis(2-oxazoline) are isolated.

Example 13

5.0 g of 5-hydroxyisophthalaldehyde is reacted with 6 g of 2-azido ethanol in diethylether. The resulting 5-hydroxy-1,3-phenylene-bis(oxazoline) is converted to the phosphate ester using 9 g of chlorodiphenylphosphate in THF in the presence of triethylamine. After recrystallization from acetone, 10 g of 5-diphenylphosphate-1,3-phenylene-bis(2-oxazoline) are isolated.

Example 14

5.0 g of 3-hydroxyphenyl-2-oxazoline, prepared by the method of D.St.C. Black, M. J. Wade, *Aust. J. Chem.* 25 (1972) 1797, incorporated herein by reference, are dissolved in THF and added to a THF solution containing 1.57 g phosphoryl chloride, $P(O)Cl_3$. The resulting solid is filtered and dissolved in water. Treatment with sodium hydroxide frees the oxazoline base from its hydrochloride salt. The phosphate ester then can be extracted from ether and recrystallized. The yield will be 5 g of tris(3-(2-oxazolyl) phenyl) phosphate.

Although the invention has been described with reference to specific embodiments, this description is not meant to be construed in a limited sense. Various modifications of the disclosed embodiments, as well as alternative embodiments of the invention, will become apparent to persons skilled in the art upon the reference to the description of the invention. The appended claims are intended to cover such modifications that fall within the scope of the invention.

We claim:

1. A fire resistive, cross-linked polymer composition comprising:
   from about 1–99% by weight of a novolak resin; and
   about 1–99% by weight of one or more bis(oxazolyl)aryl-diarylphosphate cross-linking agents.

2. The composition of claim 1, wherein said bis(oxazolyl)aryl-diarylphosphate cross-linking agent comprises compounds having the following general formula:

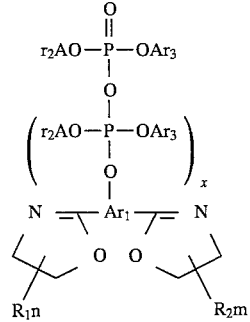

wherein $Ar_1$, $Ar_2$, and $Ar_3$ are the same or different aryl radical; and, wherein $R_1$ and $R_1$ are the same or different radicals selected from the group consisting of C1–C12, linear or branched alkyl radicals, aryl radicals, and alkoxy radicals, where m and n independently are integers having a value between 0 and about 4; and wherein x independently is an integer having a value between 0 and about 6.

3. The composition of claim 2, wherein said aryl radical is selected from the group consisting of phenyl, alkyl substituted phenyl, alkoxy substituted phenyl, naphthyl, alkyl substituted naphthyl, alkoxy substituted naphthyl, fluorenyl, alkyl substituted fluorenyl, alkoxy substituted fluorenyl, alkyl substituted antracenyl, and alkoxy substituted antracenyl.

4. The composition of claim 1 wherein said novolak resin is selected from the group consisting of a phenolic novolak resin, a resorcinolic novolak resin, and a pyrogallolic novolak resin.

5. The composition of claim 1 wherein said novolak resin comprises a resorcinolic novolak resin.

6. The composition of claim 1, wherein said novolak resin comprises aromatic hydroxyl groups wherein between about 5–25% of said aromatic hydroxyl groups comprise modified phosphorus esters.

7. The composition of claim 4, wherein said novolak resin comprises aromatic hydroxyl groups wherein between about 5–25% of said aromatic hydroxyl groups comprise modified phosphorus esters.

8. The composition of claim 5, wherein said novolak resin comprises aromatic hydroxyl groups wherein between about 5–25% of said aromatic hydroxyl groups comprise modified phosphorus esters.

9. The composition of claim 1, wherein said bis(oxazolyl)aryldiarylphosphate is selected from the group consisting of 3,5-bis(oxazolyl)phenol diphenyl-phosphate, 2,5-bis(oxazolyl)phenyl diphenyl-phosphate, or 2,4-bis(oxazolyl)phenyl diphenyl-phosphate, and tris(3-(2-oxazolyl)phenyl) phosphate.

10. The composition of claim 4 comprising between about 30 to about 70% by weight of said novolak resin and about 30 to about 70% by weight of said bis(oxazolyl)aryldiarylphosphate cross-linking agents.

11. The composition of claim 5 comprising between about 30 to about 70% by weight of said novolak resin and about 30 to about 70% by weight of said bis(oxazolyl)aryldiarylphosphate cross-linking agents.

12. The composition of claim 7 comprising between about 30 to about 70% by weight of said novolak resin and about 30 to about 70% by weight of said bis(oxazolyl)aryldiarylphosphate cross-linking agents.

13. The composition of claim 8 comprising between about 30 to about 70% by weight of said novolak resin and about 30 to about 70% by weight of said bis(oxazolyl)aryldiarylphosphate cross-linking agents.

14. A fire resistive, cross-linked polymer composition comprising:
    between about 30–70% by weight of a novolak resin; and
    between about 30–70% by weight of one or more bis(oxazolyl)aryldiarylphosphate cross-linking agents.

15. The composition of claim 14, wherein said novolak resin comprises aromatic hydroxyl groups wherein between about 5–25% of said aromatic hydroxyl groups comprise modified phosphorus esters.

16. The composition of claim 14, wherein said novolak resin is selected from the group consisting of a phenolic novolak resin, a resorcinolic novolak resin, or a pyrogallolic novolak resin.

17. The composition of claim 14 wherein said novolak resin comprises a resorcinolic novolak resin.

18. The composition of claim 15 wherein said novolak resin comprises a resorcinolic novolak resin.

19. Novel cross-linking agents comprising compounds having the following general formula:

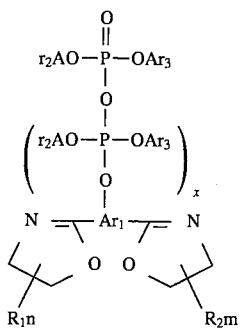

wherein $Ar_1$, $Ar_2$, and $Ar_3$ are the same or different aryl radical and where $R_1$ and $R_2$ are the same or different radicals selected from the group consisting of C1–12, linear or branched alkyl radicals, aryl radicals, and alkoxy radicals, where m and n independently are integers having a value between 0 and about 4, and where x independently is an integer having a value between 0 and about 6.

20. A process for preparing a cross-linked polymer composition having increased fire resistance, comprising the steps of:

dissolving one or more bis(oxazolyl)aryl-diarylphosphate cross-linking agents in a novolak resin; and curing said resin.

21. The process of preparing a cross-linked polymer composition having increased fire resistance as recited in claim 20, wherein said novolak resin is selected from the group consisting of phenolic novolak resins, diaryl phosphate modified phenolic novolak resin, resorcinolic novolak resins, diarylphosphate modified resorcinolic novolak resins, pyrogallolic novolak resins, diarylphosphate modified pyrogallolic novolak resins, and mixtures thereof.

22. The composition of claim 1, further comprising:

about 20–24% by weight based on the weight of said composition of a salt of a strong acid; and about 16–20% by weight based on the weight of said composition of a blowing agent inserted into the outer plies of said composition by prepregging techniques.

23. The composition of claim 1, further comprising about 2–4% by weight based on the weight of said composition of fumed silica.

24. The composition of claim 1, further comprising about 10–15% by weight based on the weight of said composition of a smoke suppressant additive selected from the group consisting of particulate MgO, $TiO_2$, $Al_2O_3.3H_2O$, $SnO_2$ and carbon black.

25. The composition of claim 7, further comprising:

about 20–24% by weight based on the weight of said composition of a salt of a strong acid; and about 16–20% by weight based on the weight of said composition of a blowing agent inserted into the outer plies of said composition by prepregging techniques.

26. The composition of claim 7, further comprising about 2–4% by weight based on the weight of said composition of fumed silica.

27. The composition of claim 7, further comprising about 10–15% by weight based on the weight of said composition of a smoke suppressant additive selected from the group consisting of particulate MgO, $TiO_2$, $Al_2O_3.3H_2O$, $SnO_2$ and carbon black.

* * * * *